United States Patent
Horn et al.

(10) Patent No.: US 10,462,017 B2
(45) Date of Patent: Oct. 29, 2019

(54) NETWORK PROPERTY VERIFICATION IN HYBRID NETWORKS

(71) Applicant: FUJITSU LIMITED, Kawasaki-shi, Kanagawa (JP)

(72) Inventors: Alexander Horn, Sunnyvale, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 33 days.

(21) Appl. No.: 15/783,395

(22) Filed: Oct. 13, 2017

(65) Prior Publication Data
US 2019/0116112 A1    Apr. 18, 2019

(51) Int. Cl.
| | |
|---|---|
| H04L 12/24 | (2006.01) |
| H04L 12/751 | (2013.01) |
| H04L 29/06 | (2006.01) |
| H04L 12/741 | (2013.01) |

(52) U.S. Cl.
CPC ............ H04L 41/145 (2013.01); H04L 45/02 (2013.01); H04L 45/74 (2013.01); H04L 69/22 (2013.01)

(58) Field of Classification Search
CPC .................................................... H04L 41/145
See application file for complete search history.

(56) References Cited

U.S. PATENT DOCUMENTS

| | | | |
|---|---|---|---|
| 9,225,601 B2 | 12/2015 | Khurshid et al. | |
| 2002/0103631 A1* | 8/2002 | Feldmann | ........... H04L 41/12 703/22 |
| 2006/0291473 A1* | 12/2006 | Chase | .............. H04L 43/12 370/395.5 |
| 2008/0062891 A1* | 3/2008 | Van der Merwe | ...... H04L 45/04 370/254 |
| 2014/0169187 A1* | 6/2014 | Jenkins | ............... H04L 43/04 370/252 |

(Continued)

OTHER PUBLICATIONS

Ahmed Khurshid, et al. (Apr. 2, 2013). "VeriFlow: Verifying Network-Wide Invariants in Real Time". 10th USENIX Symposium on NSDI '13.

(Continued)

Primary Examiner — Jason E Mattis
(74) Attorney, Agent, or Firm — Maschoff Brennan

(57) ABSTRACT

A method of network property verification, the method including obtaining a property of a network to be verified and obtaining forwarding rules for multiple network devices in the network, the forwarding rules indicative of how the network devices handle incoming packets and at least one of the network devices including forwarding rules to forward an address-based packet and forward a variable-length header packet. The method may also include generating a graph representation of the forwarding rules, where each rule of the forwarding rules is independently applicable to address-based packets or variable-length header packets. The method may additionally include assigning transition operations between the network devices in the graph representation based on the forwarding rules, assigning, in the graph representation, an atom to links between network devices that forward variable-length header packets, and verifying the property of the network using the graph representation to identify any network issue.

20 Claims, 5 Drawing Sheets

(56) References Cited

U.S. PATENT DOCUMENTS

| | | | | |
|---|---|---|---|---|
| 2016/0182355 A1* | 6/2016 | Traxler | ............ | H04L 45/02 370/359 |
| 2018/0167307 A1* | 6/2018 | Barry | ............ | H04L 45/02 |

OTHER PUBLICATIONS

Peyman Kazemian, et al. (Apr. 2, 2013). "Real Time Network policy Checking using Header Space Analysis". 10th USENIX Symposium on NSDI '13.

U.S. Appl. No. 15/411,952, filed Jan. 20, 2017.

Hongkun Yang, et al. (Aug. 16, 2016). "Scalable Verification of Networks with Packet Transformers using Atomic Predicates". Department of Computer Science, The University of Texas at Austin.

U.S. Appl. No. 15/264,501, filed Sep. 13, 2016.

Thomas Ball and Nikolaj Bjørner, et al. (Jun. 9, 2014). "VeriCon: Towards Verifying Controller Programs in Software-Defined Networks". PLDI '14.

Ryan Beckett, et al. (Aug. 22, 2014). "An Assertion Language for Debugging SDN Applications". HotSDN '14.

Marco Canini, et al. (Apr. 25, 2012). "A NICE Way to Test OpenFlow Applications". 9th USENIX Symposium on NSDI'12.

Seyed K. Fayaz, et al. (Aug. 22, 2014). "Testing Stateful and Dynamic Data Planes with FlowTest". HotSDN '14.

Seyed K. Fayaz, et al. (Mar. 16, 2016). "BUZZ: Testing Context-Dependent Policies in Stateful Networks". 13th USENIX Symposium on NSDI '16.

Radu Stoenescu, et al. (Apr. 11, 2016). "SymNet: scalable sympolic execution for modern networks". SIGCOMM 2016.

Yaron Velner, et al. (Apr. 2, 2016). "Some Complexity Results for Stateful Network Verification". TAGAS 2016.

E. Al-Shaer, et al. (Oct. 13, 2009). "Network configuration in a box: towards end-to-end verification of network reachability and security". 17th IEEE International Conference on Network Protocols, ICNP.

Nikolaj Bjørner, et al. (Aug. 8, 2016). "ddNF: An efficient data structure for header spaces". Tech. rep., Microsoft Research.

Ari Fogel, et al. (May 4, 2015). "A general approach to network configuration analysis." 12th USENIX Symposium on Networked Systems Design and Implementation, NSDI'15.

Aaron Gember-Jacobson, et al. (Aug. 22, 2016). "Fast control plane analysis using an abstract representation". SIGCOMM'16.

Karthick Jayaraman, et al. (Jul. 26, 2014). "Automated analysis and debugging of network connectivity policies". Tech. rep., Microsoft Research.

Alan Jeffrey, et al. (Jul. 20, 2009). "Model checking firewall policy configurations". IEEE International Symposium on Policies for Distributed Systems and Networks.

Peyman Kazemian, et al. (Apr. 2, 2013). "Real time network policy checking using header space analysis". 10th USENIX Symposium on Networked Systems Design and Implementation, NSDI'13.

Peyman Kazemian, et al. (Apr. 25, 2012). "Header space analysis: Static checking for networks". 9th USENIX Symposium on Networked Systems Design and Implementation, NSDI'12.

Nuno. P. Lopes, et al. (May 4, 2015). "Checking beliefs in dynamic networks". 12th USENIX Symposium on Networked Systems Design and Implementation, NSDI'15.

Haohui Mai, et al. (Aug. 15, 2011). "Debugging the data plane with Anteater". SIGCOMM'11.

Timothy Nelson, et al. (Nov. 7, 2010). "The Margrave tool for firewall analysis". 24th Large Installation System Administration Conference, LISA'10.

Sooel Son, et al. (Jun. 9, 2013). "Model checking invariant security properties in Open-Flow". IEEE International Conference on Communications, ICC'13.

Geoffrey G. Xie, et al. (Jun. 2004). "On static reachability analysis of IP networks". IEEE INFOCOM 2004.

Hongkun Yang, et al. (Oct. 7, 2013). "Real-time verification of network properties using atomic predicates". Network Protocols (ICNP), 2013 21st IEEE International Conference on Network Protocols (ICNP).

Lihua Yuan, et al. (May 21, 2006). "FIREMAN: A toolkit for firewall modeling and analysis". IEEE Symposium on Security and Privacy (S&P'06).

* cited by examiner

US 10,462,017 B2

NETWORK PROPERTY VERIFICATION IN HYBRID NETWORKS

FIELD

The embodiments discussed in the present disclosure are related to network property verification in hybrid networks.

BACKGROUND

With the proliferation of computer networks, there has also arisen a variety of different protocols associated with such computer networks. For example, some networks utilize internet protocol (IP) to communicate. As another example, some networks utilize multiprotocol label switching (MPLS) to communicate. In some cases, approximately 25% of paths across the Internet traverse at least some portion of an MPLS network.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method of network property verification in a network. The method may include obtaining a property of a network to be verified, and obtaining forwarding rules for multiple network devices in the network. The forwarding rules may be indicative of how the network devices handle an incoming packet, and at least one of the network devices may include at least a first forwarding rule configured to forward an address-based packet and a second forwarding rule configured to forward a variable-length header packet. The method may also include generating a graph representation of the forwarding rules in the network, where each rule of the forwarding rules may be independently applicable to address-based packets or variable-length header packets. The method may additionally include assigning transition operations between the network devices in the graph representation based on the forwarding rules. The method may also include assigning, in the graph representation, an atom to links between any of the network devices that forward packets in a format of the variable-length header packet. The atom may represent a range of addresses applicable to one or more of the address-based packets. The method may additionally include verifying the property of the network using the graph representation to identify any network issue.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
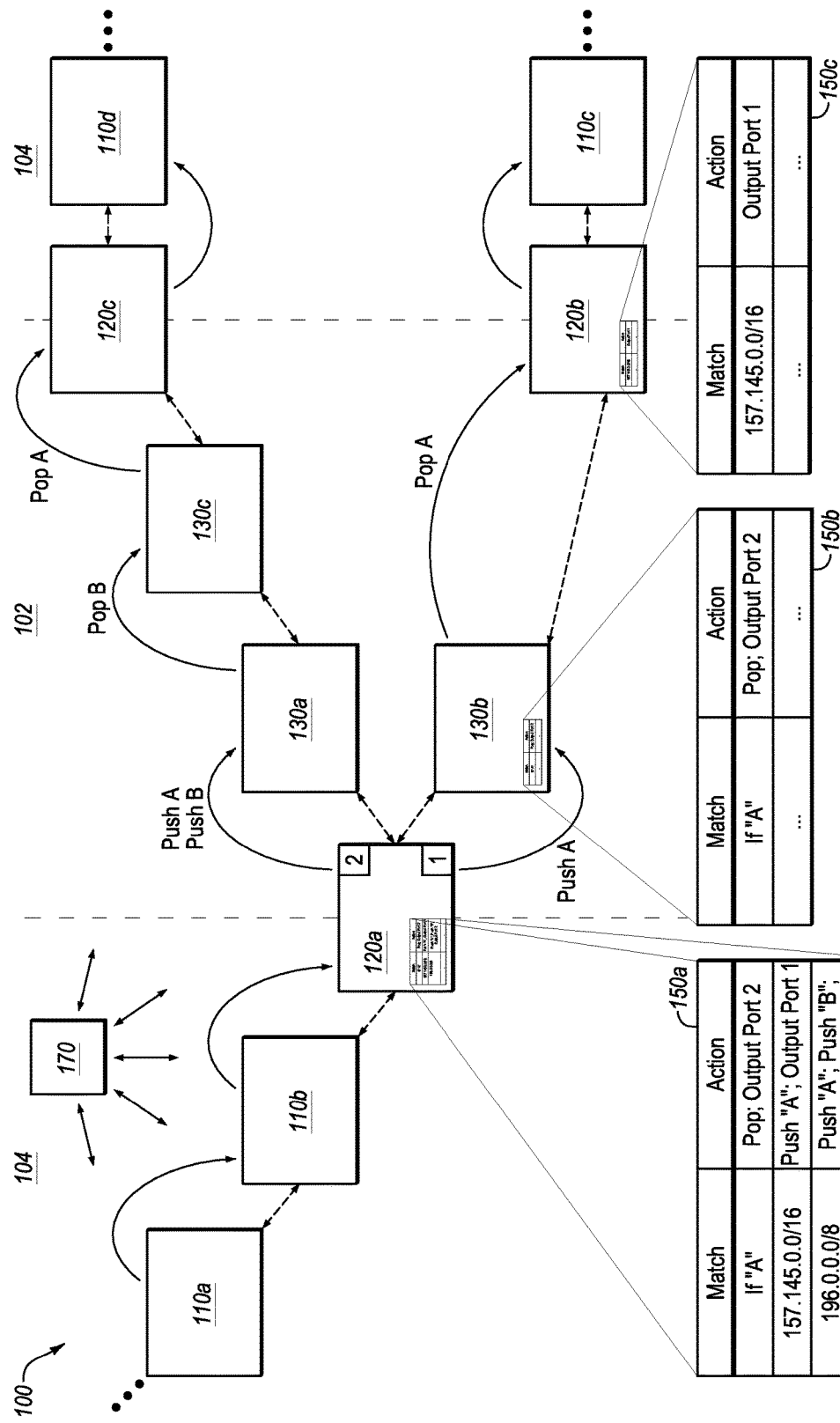
FIG. 1 illustrates an example environment related to network property verification in a hybrid network.

Some embodiments of the present disclosure relate to network property verification in hybrid networks, including network path verification for packets traversing a network with portions that handle multiple formats of packets. For example, the network may be a hybrid network that handles multiprotocol label switching (MPLS) packets and Internet Protocol (IP) packets. The present disclosure may utilize a graph representation of the network to verify network properties of such a hybrid network. The graph representation may be generated by representing network devices in the network as states in a pushdown automata, and forwarding rules of the network devices as the transitions between the states (e.g., the edges in the graph representation). In some embodiments, atoms (e.g., half-intervals representing distinct portions of address ranges where the set of all atoms represents all possible address ranges) may be assigned to various edges to identify what range of addresses follow along that edge. An example of the use of such atoms in representing a network and verifying properties of such a network is disclosed in U.S. application Ser. Nos. 15/264,501 and 15/610,590, which are hereby incorporated by reference in their entireties.

Additionally, in one or more embodiments of the present disclosure, the graph representation may include a pushdown automata that utilizes a stack to represent the various layers of headers in an MPLS network. An example of utilizing such a pushdown automata to represent MPLS encapsulating and de-encapsulating actions is disclosed in U.S. application Ser. No. 15/411,952, the entirety of which is hereby incorporated by reference.

In some embodiments, because the network includes both an address-based portion and a variable-length header portion, a hybrid approach between the disclosure of U.S. application Ser. Nos. 15/610,590 and 15/411,952 may be taken. For example, a graph representation of a pushdown automata that includes atom labels for one or more of the edges may be used. In these and other embodiments, transitive edges may be identified within the graph representation. As used herein, a transitive edge may represent a series of network devices in the variable-length header portion of the network that collectively handle packets with a destination address within a range of addresses in the address-based network in the same manner. For example, a transitive edge may represent a set of network devices that perform successive MPLS label operations on a packet that terminates with all MPLS labels being removed from the packet. In the graph representation, the series of network devices performing the MPLS label operations (e.g., the transitive edge) may be collapsed with respect to the atom labels. An atom assigned to the entry edge or state associated with the transitive edge may be propagated to the exit edge or state, indicating that for that range of addresses, the treatment within the network is the same.

Because of the difficulty in analyzing an IP network or an MPLS network, let alone a hybrid of the two, one or more embodiments of the present disclosure may provide a solution to a technical problem that allows a network to operate in an improved manner. For example, some embodiments of the present disclosure provide a solution that may verify and/or analyze networks that handle packets of variable-length headers in addition to address-based packets.

Furthermore, the present disclosure accomplishes this improvement without sending excessive packets through the network to analyze and monitor the network, thereby incurring no or negligible performance overhead to the normal operation of the network. Rather, the present disclosure utilizes a graph representation of the network, thereby reducing bandwidth problems and reducing the burden on the network. Thus, some embodiments of the present disclosure provide a solution that improves the functioning of computers and networks, and also provide improvements to the field of network verification. Through the presently described improvements, it is possible to detect a broader class of potential network issues or problems before they manifest themselves, which can reduce network malfunctioning, increasing network reliability. An example of a network malfunctioning is the unreachability between nodes in the network that should be logically connected but for some reason fail to be able to communicate due to a misconfiguration.

Embodiments of the present disclosure are explained with reference to the accompanying drawings.

FIG. 1 illustrates an example environment 100 related to network property verification in a hybrid network, in accordance with one or more embodiments of the present disclosure. FIG. 1 additionally illustrates the progression of packets through a hybrid network with a first portion 102 of the network configured to handle packets with variable-length headers (e.g., a portion of the network that handles MPLS packets) and a second portion 104 of the network configured to handle address-based packets (e.g., a portion of the network that handles IP packets). While reference may be made to MPLS packets and IP packets, it will be appreciated that any variable-length header packet format and/or any address-based packet format may be used in conjunction with the present disclosure. As used herein, by describing a network device as "handling" a certain type or format of packet, the network device may be understood to include one or more forwarding rules or other processing rules such that after receiving such a packet, the network device may route the packet through the network.

The environment 100 may include one or more IP network devices 110 configured to handle IP packets (such as the IP network devices 110a, 110b, 110c, and 110d). The environment 100 may additionally include one or more boundary network devices 120 configured to handle both IP packets and MPLS packets (such as the boundary network devices 120a, 120b, and 120c). The boundary network devices 120 may be conceptually thought of as acting as a boundary between the first portion 102 and the second portion 104, or stated another way, the boundary network devices 120 may route packets from the second portion 104 into the first portion 102, and vice versa. Any of the network devices within the environment 100 that handle both IP and MPLS packets may act as a boundary for a given set of packets. Thus, for different sets of packets (e.g., different ranges of IP addresses), the boundaries between the first portion 102 and the second portion 104 may be different. The environment 100 may also include one or more MPLS network devices configured to handle MPLS packets (such as the MPLS network devices 130a, 130b, and 130c). In these and other embodiments, the network devices may include a forwarding table 150 that includes forwarding rules identifying how the network device is configured to route packets through the network. For example, the boundary network device 120a may include the forwarding table 150a, the MPLS network device 130b may include the forwarding table 150b, and the boundary network device 120b may include the forwarding table 150c.

The solid arrows of FIG. 1 illustrate routing of packets through the environment 100. For example, an IP packet may be forwarded from the IP network device 110a to the IP network device 110b based on an address-based forwarding rule in the forwarding table (not shown) of the IP network device 110a. Continuing the example, the IP packet may be forwarded from the IP network device 110b to the boundary network device 120a based on a forwarding rule in the forwarding table (not shown) of the IP network device 110b.

Based on receiving an incoming packet, the boundary network device 120a may check to see if the highest priority forwarding rule of the forwarding table 150a is applicable to the incoming packet. If the highest priority rule is not applicable to the incoming packet, the network device 120a may check to see if the next highest priority rule is applicable to the incoming packet. For example, the boundary network device 120a may check to see if the packet includes the MPLS label "A." If the packet does not include the MPLS label "A," the boundary network device 120a may check to see if the IP destination address of the packet is within the range of addresses covered by the IP prefix 157.145.0.0/16, and if not, may check to see if the destination address of the packet is within the range of addresses covered by the IP prefix 196.0.0.0/8. Based on which rule is applicable, the boundary network device 120a may route the packet based on the applicable forwarding rule. For example, if the packet includes the destination address 157.145.15.18 (thereby falling within the range of the second rule), the boundary network device 120a may perform the actions of "Push A" and output the packet on Port 1, which determines the next hop of the packet. The operations "Push" and "Pop" may refer to operation associated with MPLS packets of (1) encapsulating a packet with an MPLS header or with a label that is identifiable by MPLS network devices, and (2) de-encapsulating the outer-most MPLS header, respectively. For example, the first rule of the forwarding rule 150a would de-encapsulate the outermost MPLS header, provided it matches the MPLS label "A." The second rule would encapsulate the packet with an MPLS header with the label "A," provided the destination address of the incoming packet falls in the range of 157.145.0.0/16. In a similar fashion, the third rule would encapsulate the packet with an MPLS label "A," followed by encapsulating the packet (now with the MPLS label "A") with the MPLS label "B."

The boundary network device 120a may be configured to handle both IP packets and MPLS packets as illustrated by the various forwarding rules in the forwarding table 150a. Additionally, the boundary network device 120a may be configured to transition IP packets from the second portion 104 into the first portion 102 of the network.

In some embodiments, the forwarding tables 150 may be configured to include rules that operate on one of IP packets or MPLS packets. For example, a first forwarding rule may be configured to match an IP address and add one or more MPLS labels, a second forwarding rule may be configured to match an IP address and output the packet to a given port, a third forwarding rule may be configured to match an MPLS label and add or remove an MPLS label. In these and other embodiments, a rule that attempts to match an IP address when an MPLS encapsulation stack is not empty (e.g., the packet is still encapsulated with one or more MPLS labels) may generate an error or cause the network device to drop the packet. Additionally or alternatively, a rule that is configured to match an IP address, and in response Pop an MPLS label, may generate an error or cause the network device to drop the packet.

Returning to the example flow of the packet in FIG. 1, if the incoming packet to the boundary network device 120a includes the destination address 157.145.15.18 (thereby falling within the range of the second rule), the boundary network device 120a may perform the actions of "Push A" and output the packet on Port 1 (designated by the arrow with "Push A" going from the boundary network device 120a to the MPLS network device 130b). Based on receiving an incoming packet, the MPLS network device 130b may compare the packet to the forwarding rules in the forwarding table 150b. Based on the packet including the MPLS label A which matches the first rule, the MPLS network device 130b may Pop the outermost MPLS label and output the packet to the boundary network device 120b. Based on receiving the packet, the boundary network device 120b may compare the packet to the forwarding rules of the forwarding table 150c. Based on the MPLS stack being empty (e.g., the packet having all MPLS labels removed) and the destination address matching the range of IP addresses in the IP prefix of the first rule, the boundary network device 120b may output the packet to the IP network device 110c.

The first portion 102 and second portion 104 of the network may include any network or configuration of networks configured to send and receive communications between devices. In some embodiments, the first portion 102 and second portion 104 of the network may be configured to communicate using any number of protocols, including internet protocol suite (including for example, internet protocol (IP), transmission control protocol (TCP), user datagram protocol (UDP), internet control message protocol (ICMP), hypertext transfer protocol (HTTP), post office protocol (POP), and the like), AppleTalk, internetwork packet exchange/sequenced packet exchange (IPX/SPX), Open Systems Interconnection (OSI), Systems Network Architecture (SNA), DECnet, and others. Additionally or alternatively, the first portion 102 and second portion 104 of the network may operate with multiple protocols or in a manner to accommodate multiple protocols, such as multi-protocol label switching (MPLS). In some embodiments, the second portion 104 may operate using the internet protocol suite and the first portion 102 may operate as an MPLS network.

In some embodiments, the first portion 102 and second portion 104 of the network may be implemented as a conventional type of network, a wired or wireless network, and/or may have numerous different configurations. Furthermore, the first portion 102 and second portion 104 of the network may include a local area network (LAN), a wide area network (WAN) (e.g., the Internet), or other interconnected data paths across which multiple devices and/or entities may communicate. In some embodiments, the first portion 102 and second portion 104 of the network may include a peer-to-peer network. The first portion 102 and second portion 104 of the network may also be coupled to or may include portions of a telecommunications network for sending data in a variety of different communication protocols. In some embodiments, the first portion 102 and second portion 104 of the network may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, or other approaches. The first portion 102 and second portion 104 of the network may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks.

As illustrated in FIG. 1, the dashed arrows between the IP network devices 110, the boundary network devices 120, and/or the MPLS network devices 130 may represent physical connections between network devices such as coaxial cables, optical fibers, twisted pair cables (such as category 5 cable), or the like. Additionally or alternatively, the dashed arrows may indicate a logical connection between the network devices. Such physical or logical connections between network devices may be referred to as links between network devices.

In some embodiments, a control device 170 may be configured to obtain the forwarding rules of the network devices in the first portion 102 and the second portion 104. Additionally or alternatively, the control device 170 may be configured to obtain a layout of a data plane of the network at a given point in time. The data plane may refer to how packets are routed through a network, for example, the combination of the physical layout of the network and how the devices within the network route packets among the devices based on the forwarding rules. In these and other embodiments, the control device 170 may obtain the forwarding rules of each of the IP network devices 110, the boundary network devices 120, and/or the MPLS network devices 130 and the physical connections between the IP network devices 110, the boundary network devices 120, and/or the MPLS network devices 130. In some embodiments, the control device 170 may be in communication with each of the IP network devices 110, the boundary network devices 120, and/or the MPLS network devices 130. Additionally or alternatively, the control device may be in communication with another electronic device that monitors the physical layout and/or the forwarding rules of the first portion 102 and the second portion 104 of the network. In these and other embodiments, the control device 170 may be implemented as a computing device or a computing system such as the computing system 500 of FIG. 5.

In some embodiments, the control device 170 may be configured to verify one or more properties of the network. The properties may include network paths, network reachability, distances measured between points in the network according to the number of hops a packet may traverse for it to be delivered to the expected recipient, a form of packet travel time between two points in the network as a function of distance and capabilities of network links, network service time, among others. For example, the control device 170 may be configured to verify that a packet travels through the network as expected by the control device 170, or that a packet travels through the network as quickly as expected, or the like. For example, an administrator of the network may expect a certain ingress and egress to be available, a certain network path to be followed, or a certain network packet travel time to be within a threshold. In some embodiments, the properties may be metrics placed by the administrator. In these and other embodiments, the properties may be based on forwarding rules of one or more devices within the network. Other properties may include detecting loops in the network and identifying network devices from which a packet may never be forwarded, also known as "blackholes."

In some embodiments, the control device 170 may verify one or more properties of the network by generating a pushdown automata representing the network and applying a saturation-based algorithm to the pushdown automata. A pushdown automata may include a last-in, first-out (LIFO) stack. For example, a pushdown automata that has elements, A, B, and C added in that order may include a stack of elements A, B, and C with only element C accessible, since C is at the "top" of the stack because it was added last. After element C has been removed, element B may be accessible, and after element B has been removed, element A may be accessible. Transitioning between elements may represent changes in states associated with the pushdown automata.

For example, the control device 170 may be instructed to verify a property, such as the path between two points in the network. Using the pushdown automata representation, the control device 170 may apply a saturation-based algorithm (or other algorithm) to explore the reachability space and the transitions within the network. As the control device 170 explores the pushdown automata using the saturation-based algorithm, the control device 170 may compare the representative transitions of the algorithm to an expected transition or destination. In these and other embodiments, if the network does not operate as expected, such a result may trigger an error indicating that the operation of the network is outside of the expected behavior.

In some embodiments, the control device 170 may verify one or more properties of the network by generating a representation of the network as a pushdown automata. For example, the control device 170 may generate the pushdown automata by representing each of the network devices as one or more states in the push down automata, and representing the transitions between the states as one or more push or pop operations. The control device 170 may generate such a pushdown automata based on the forwarding rules of the network devices. Examples of generating such a pushdown automata may be described in U.S. application Ser. No. 15/411,952, the entirety of which is hereby incorporated by reference.

In some embodiments, the pushdown automata may include atoms applied to one or more of the edges of the pushdown automata. An atom may represent a half-closed interval representing a distinct sub-range of addresses. The set of all atoms may represent all possible address ranges. Additionally or alternatively, for edges with applicable atoms, one or more rules may be designated as owning the atom, meaning that packets with addresses that fall within a particular range identified by an atom may be handled by the rule that owns the corresponding atom. An example of the use of atoms in verifying one or more network properties may be described in U.S. application Ser. No. 15/610,590, the entirety of which is hereby incorporated by reference.

In some embodiments, based on all properties being verified, the control device 170 may generate a message indicating that the network is behaving as expected. In some embodiments, if on one or more properties are violated, the control device 170 may take one or more actions to notify and/or otherwise address the lack of verification (e.g., by constructing a counterexample that exhibits the property violation). In some embodiments, the control device 170 may generate a message to cause one or more network devices of the network to change or update the forwarding rules of the network devices. As another example, the control device 170 may cause one or more network devices of the network to activate or deactivate one or more physical communication channels. As an additional example, the control device 170 may cause one or more network devices of the network to power down, power up, or otherwise adjust a mode of operation of the network device. In these and other embodiments, the action may be a remedial action to change the operation of the network to more closely match the expected behavior of the network. If the observed changes in the network are due to an erroneous manual or automated reconfiguration of the network (rather than, for example, a failure in the network), the control device may ignore, delay (with an appropriate warning message to the network operators), or reverse, the triggered changes of the network to preserve expected behavior of the network.

Modifications, additions, or omissions may be made to the environment 100 without departing from the scope of the present disclosure. For example, the environment 100 may include any number of IP network devices 110, boundary network devices 120, and MPLS network devices 130 connected in any manner and with any combination of forwarding rules for forwarding IP packets, MPLS packets, or both. In many cases, the environment 100 may include more network devices than illustrated. Additionally or alternatively, the environment 100 may include more than one control device 170.

Figure 2:
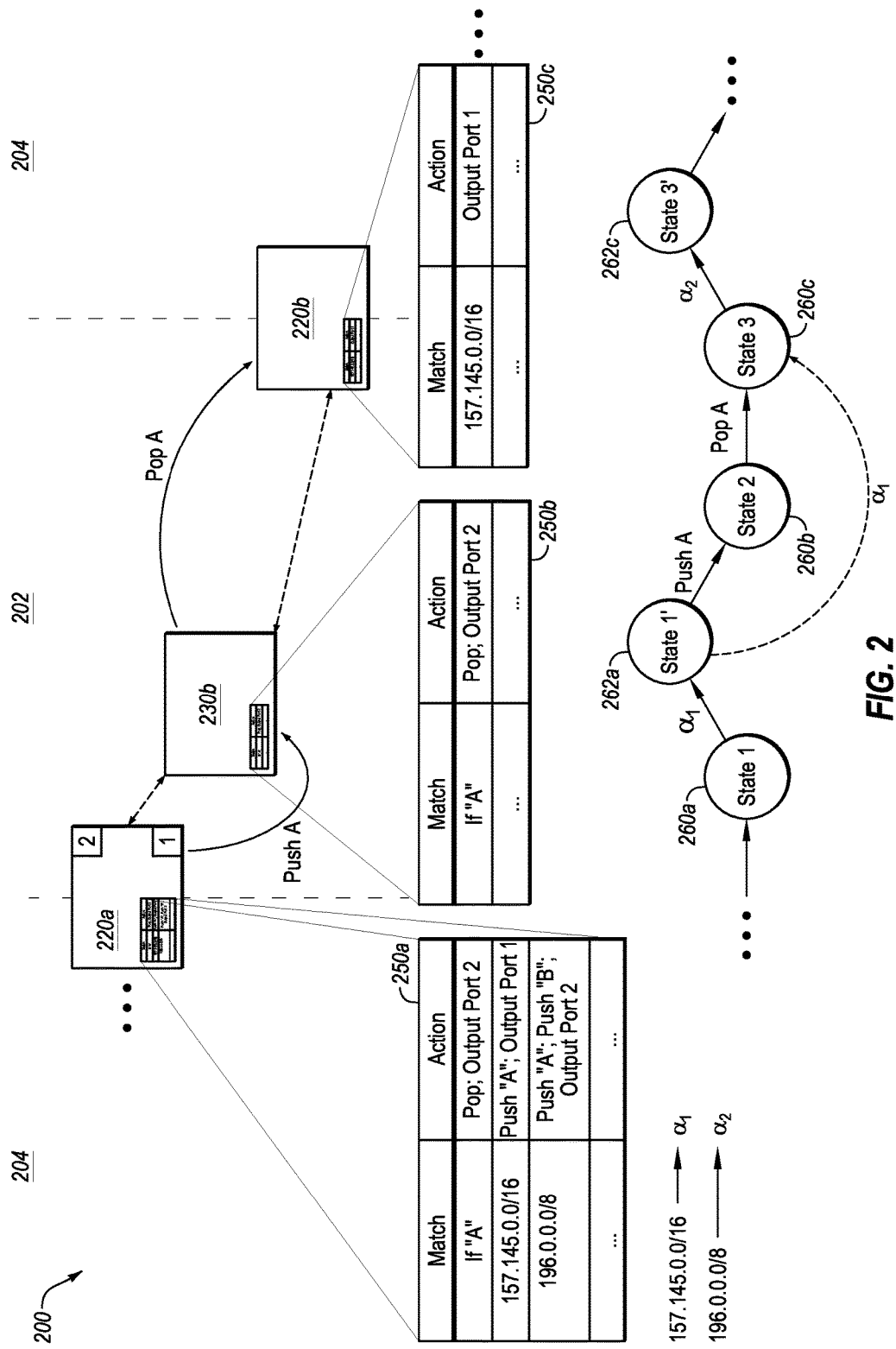
FIG. 2 illustrates another example environment related to network property verification in a hybrid network.

FIG. 2 illustrates another example environment 200 related to network property verification in a hybrid network, in accordance with one or more embodiments of the present disclosure. The environment 200 may be similar or comparable to the environment 100. For example, the boundary network devices 220a and 220b may be similar or comparable to the boundary network devices 120a and 120b of FIG. 1; the MPLS network device 230b may be similar or comparable to the MPLS network device 130b of FIG. 1, the forwarding tables 250a, 250b, and 250c may be similar or comparable to the forwarding tables 150aa, 150b, and 150c of FIG. 1; and the first portion 202 and second portions 204 of the network may be similar or comparable to the first portion 102 and second portion 104 of the network of FIG. 1.

As illustrated in FIG. 2, when generating a pushdown automata as a way of obtaining a form of a graph representation of the network, each of the network devices may be represented as a state. For example, the boundary network device 220a may correspond to State 1 260a shown in the graph representation, the boundary network device 220b may correspond to State 3 260c shown in the graph representation, and the MPLS network device 230b may correspond to State 2 260b shown in the graph representation. In some embodiments, network devices that include rules that match IP address ranges may be assigned an additional state. Such additional states are illustrated as State 1 ' 262a and State 3' 262c. In these and other embodiments, atoms may be assigned to the edges leading away from the IP address matching network devices. For example, the atom a1 may represent the range of addresses that are affected by the rule that routes packets from the boundary network device 220a to the MPLS network device 230b. Thus, the edge from State 1 to State 1' in the pushdown automata may be labelled with $\alpha_1$. In these and other embodiments, edges that perform one or more Push or Pop operations may also be labeled along edges. For example, the transition from State 1' to State 2 may be labelled with Push A and the transition from State 2 to State 3 may be labelled with Pop A.

In some embodiments, transitive edges may be identified within the pushdown automata. A transitive edge may represent a series of network devices in the variable-length header portion of the network that collectively handle packets with a destination address within a range of addresses in the address-based network in the same manner. For example, with reference to FIG. 2, after transitioning to State 1', as long as the IP address of the packet is within the range of addresses, the transition from State 1' to State 2 may be the same, namely, encapsulating a packet with the MPLS label "A." In like manner, the transition from State 2 to State 3 is also known to occur for packets with an IP address within the range of addresses, as the transition includes de-encapsulating the packet with the MPLS label "A." As these two operations have rendered the MPLS stack empty (e.g., all labels added have been removed), these edges may be identified collectively as a transitive edge, meaning that an IP packet that arrives at State 1' will arrive at State 3.' The transitive edge may be represented by the dashed arrow. Stated another way, the transitive edge may represent a path or tunnel for a given range of IP addresses associated with an atom through the first portion 202 of the network (e.g., the portion that handles MPLS packets).

As illustrated in FIG. 2, the range of addresses associated with the atom a1 may include 157.145.0.0 to 157.145.255.255 (e.g., 157.145.0.0/16) while the range of addresses associated with the atom $\alpha_2$ may include 196.0.0.0 to 196.255.255.255 (e.g., 196.0.0.0/8). In these and other embodiments, the transitive edge illustrated in FIG. 2 may be atom-specific, meaning that the transitions from State 1 to State 1' may be applicable to the atom a1 but not necessarily be applicable to the atom $\alpha_2$. In these and other embodiments, an additional state (not illustrated) may be generated for the graph representation for the atom $\alpha_2$.

In some embodiments, atoms may be propagated from one edge to another edge in the graph representation based on certain conditions. For example, an atom may be propagated from one end of a transitive edge to another, essentially bypassing a portion of the graph representation with respect to a given atom. Stated another way, for a given atom, the question of reachability and path traversal is known/resolved along the transitive edge so the atom may be propagated across the transitive edge. In some embodiments, a saturation-based algorithm (or other space-exploring algorithms, such as a depth-first search (DFS) or breadth-first search (BF S) algorithm) may be used to determine which combination of edges may be identified as transitive edges. For example, the saturation-based algorithm may explore the possibilities for forwarding packets through the network based on the forwarding rules and the graph representation, and as it searches the space of the graph representation, the algorithm may identify those series of states that may be represented by a transitive edge. The application of such a saturation-based algorithm may be similar or comparable to the process described in U.S. application Ser. No. 15/411,952. After the presence of the transitive edges have been determined, that transitive edge may be treated as any other edge with a corresponding atom label in analyzing the graph representation of the network. For example, the graph representation may be analyzed using the atoms as described in U.S. application Ser. No. 15/610,590. An example of employing both approaches may be described with reference to FIGS. 3 and/or 4 of the present disclosure.

Modifications, additions, or omissions may be made to the environment 200 without departing from the scope of the present disclosure. For example, the environment 200 may include any number of IP network devices 210, boundary network devices 220, and MPLS network devices 230 connected in any manner and with any combination of forwarding rules for forwarding IP packets, MPLS packets, or both. In many cases, the environment 200 may include more network devices than illustrated. As another example, the forwarding tables 250 may include any number of rules, and in many cases, will include many more rules than illustrated.

Figure 3:
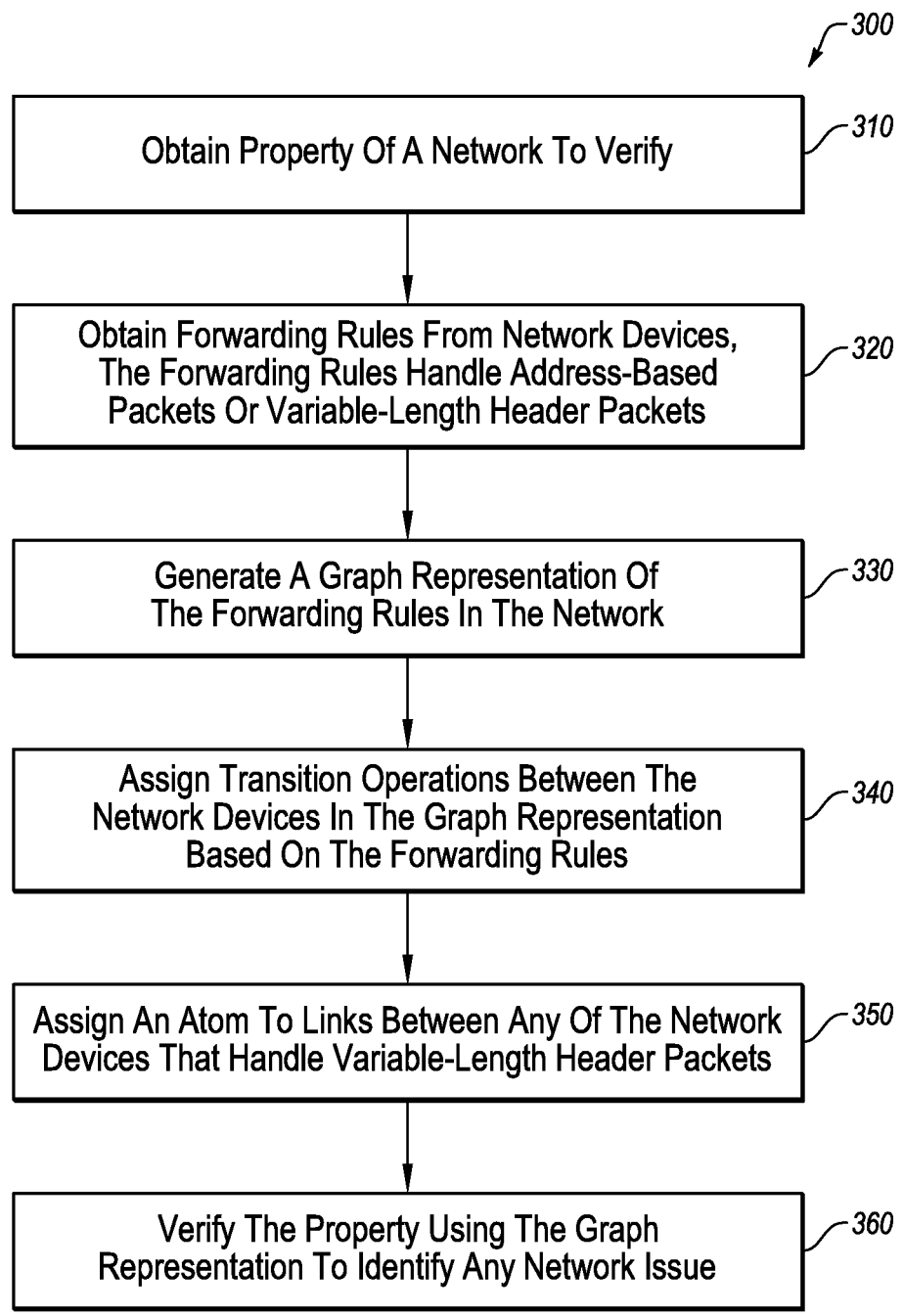
FIG. 3 illustrates a flowchart of an example method of network property verification in a hybrid network.

FIG. 3 illustrates a flowchart of an example method 300 of network property verification in a hybrid network, in accordance with one or more embodiments of the present disclosure. Although illustrated as discrete blocks, various blocks may be divided into additional blocks, combined into fewer blocks, or eliminated, depending on the particular implementation.

At block 310, properties of a network that are to be verified may be obtained. For example, a control device (such as the control device 170 of FIG. 1) may obtain properties of a network (such as a network with the first portion 102 and the second portion 104 of FIG. 1) to be verified. In some embodiments, a user may interact with the control device to designate one or more properties to be verified. Additionally or alternatively, the control device may be configured to periodically verify one or more properties of the network. In some embodiments, a network failure or network realignment (such as reassigning a physical network connection, or changing a network configuration) may trigger the control device to verify one or more properties of the network. In some embodiments, the control device may maintain the properties of the network as expected behavior of the network. In some embodiments, the network may include a first portion configured to handle MPLS packets and a second portion configured to handle IP packets.

At block 320, forwarding rules for network devices in the network may be obtained. For example, the control device may obtain forwarding rules for address-based network devices (such as the IP network devices 110 of FIG. 1), boundary network devices (such as the boundary network devices 120 of FIG. 1), and/or variable-length header packet handling network devices (such as the MPLS network devices 130 of FIG. 1). In some embodiments, the forwarding rules associated with the property to be verified may be obtained. For example, if the property to be verified includes paths across the entire network, the control device may obtain all forwarding rules for all network devices, or a meaningful subset thereof. As another example, if the property to be verified is related to one particular path or performance of one particular path (such as a path using a new physical connection), only forwarding rules of the network devices used in the particular path may be obtained. In some embodiments, the control device may send a message to one or more network devices to instruct the network devices to retrieve the forwarding rules stored on the one or more network devices and return a message to the control device with the forwarding rules. Additionally or alternatively, algorithms of the present disclosure may begin at the state of the relevant portion of the network. In some embodiments, a given forwarding rule may handle an address-based packet, or a variable-length header packet, but not both, while a given network device may have multiple forwarding rules where some forwarding rules handle address-based packets and other rules handle variable-length header packets.

At block 330, a graph representation may be generated based on the forwarding rules. For example, the control device may utilize the forwarding rules of the network devices to generate the graph representation. In some embodiments, the graph representation may include a pushdown automata to represent the network. In these and other embodiments, generation of the graph representation may be accomplished by representing each network device related to the properties to be verified (which may include all network devices in the network in some embodiments) as one or more states in a pushdown automata. One example of generating a graph representation may be described with respect to FIG. 4.

At block 340, transition operations between the network devices may be assigned in the graph representation based on the forwarding rules. For example, the transitions between the states in the graph representation may represent the various forwarding rules. With reference to FIG. 1, the transition operation from the MPLS network device 130a to 130c may be assigned as Pop B, indicating the transition from the state from 130a to 130c removes the MPLS label "B."

At block 350, an atom may be assigned to links between any of the network devices that handle variable-length header packets. For example, an algorithm (such as a saturation-based algorithm) may be applied to the graph representation to identify one or more transient edges within the graph representation. In these and other embodiments, the graph representation may include labels for one or more of the edges in the graph representation. Such labels may include atoms indicative of which range of addresses may be affected by a given forwarding rule or which range of addresses are affected by a given transition from one state to another (e.g., which range of addresses are routed from one network device to another in the network).

At block 360, the network property may be verified using the graph representation. For example, the control device may apply a saturation-based algorithm to the graph representation such that in applying the algorithm, at one or more steps in the algorithm, the control device may compare the property to a feature of the graph representation. In some embodiments, the saturation-based algorithm may explore the reachability space of the network to verify one or more operations that represent the transition across multiple hops in the network.

Figure 4:
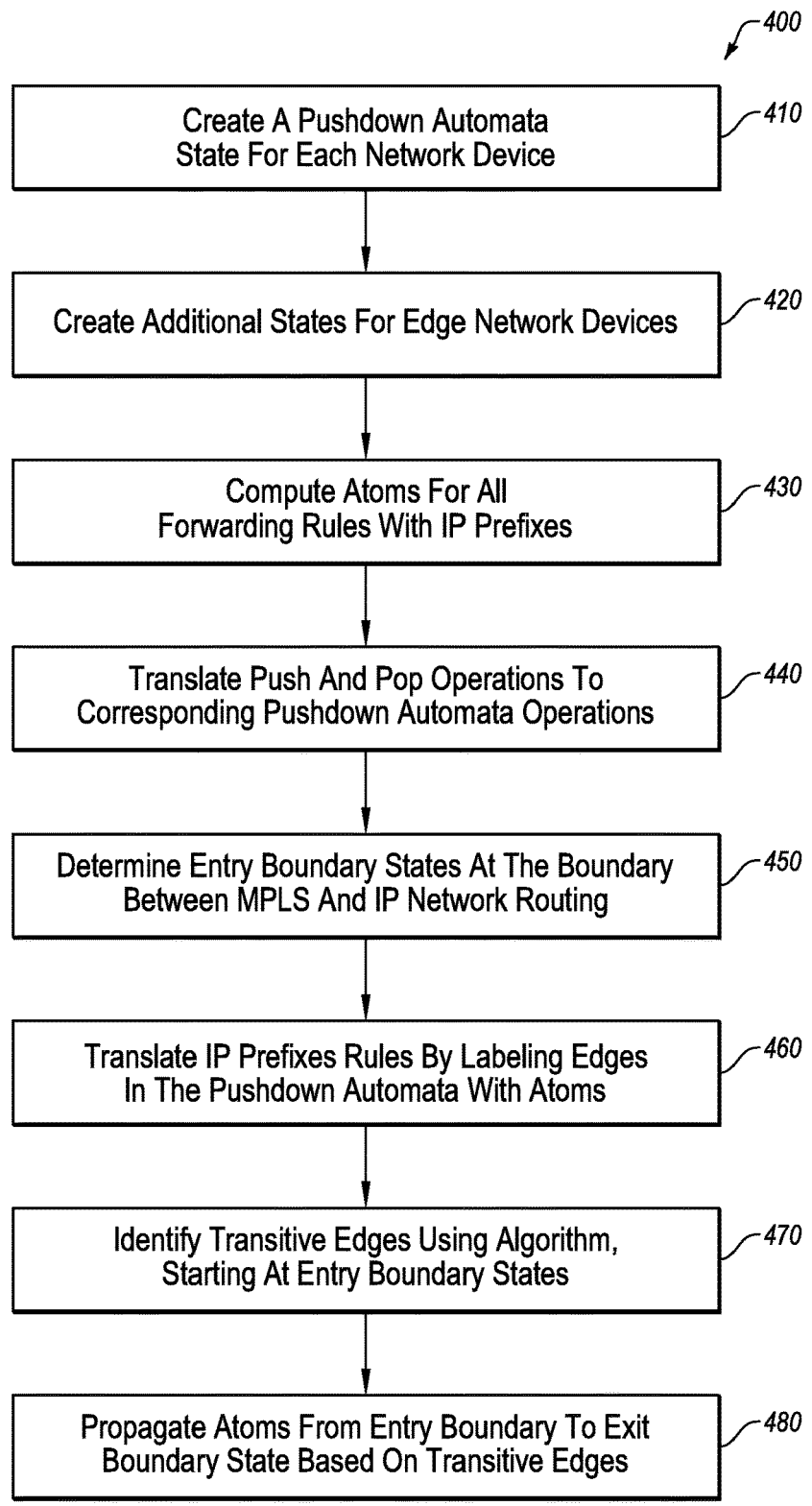
FIG. 4 illustrates a flowchart of an example method of generating a graph representation to facilitate network property verification in a hybrid network.

FIG. 4 illustrates a flowchart of an example method 400 of generating a graph representation to facilitate network property verification in a hybrid network, in accordance with one or more embodiments of the present disclosure. For example, various operations of the method 400 may be expansions of or specific examples of various ways to carry out the operations of FIG. 3. Although illustrated as discrete blocks, various blocks may be divided into additional blocks, combined into fewer blocks, or eliminated, depending on the particular implementation.

At block 410, a pushdown automata state may be created for each network device. For example, as described above and as illustrated in FIG. 2, in generating a graph representation of a network, each network device may be represented by a state and the forwarding rules to route packets from one network device to another may be represented by edges in the pushdown automata.

At block 420, one or more additional states may be created for boundary network devices. For example, for network devices that route packets from an address-based portion of the network (e.g., an IP-based portion of the network) into a variable-length header portion of the network (e.g., an MPLS portion of the network), an additional state may be generated. In these and other embodiments, the boundary network devices may include a forwarding rule that maps an IP address or range of IP addresses to one or more Push MPLS actions.

At block 430, one or more atoms may be computed for all forwarding rules associated with a range of addresses. For example, as described in U.S. application Ser. No. 15/610,590, atoms may be assigned to each discrete range of addresses such that the range of addresses affected by rule is assigned to one or more atoms. In these and other embodiments, an owner may be assigned to an atom for a given state in the pushdown automata such that any range of addresses that may potentially be covered by more than one rule may identify the applicable rule to that atom.

At block 440, push and pop operations associated with forwarding rules in the variable-length header portion of the network are converted to corresponding pushdown automata operations. For example, the encapsulation of a packet with an additional layer (e.g., an additional MPLS label) may be translated into the addition of a new layer in the pushdown automata stack using a push operation. As another example, the de-encapsulation of a packet by removal of a layer (e.g., removing an MPLS label) may be translated into the removal of a layer in the pushdown automata stack using a pop operation. In these and other embodiments, such a process may be repeated for all forwarding rules associated with a variable-length header (e.g., all rules that match an MPLS label, or match an IP Address and Push an MPLS label).

At block 450, entry boundary states may be determined for states at the boundary between variable-length header (e.g., MPLS) and address-based (e.g., IP) network routing. The entry boundary states may correspond to the network devices that match IP addresses and add an MPLS label to the packet or otherwise route the packets from the address-based portion of the network into the variable-length header portion of the network.

At block 460, the forwarding rules associated with the address-based portion of the network (e.g., the IP prefix rules) may be translated into the pushdown automata by labeling edges in the pushdown automata with atoms. For example, one or more atoms for the range of addresses covered by a given forwarding rule may be assigned to an edge (e.g., the transition from one state to another) to identify what addresses of packets transition from one state to another. In these and other embodiments, the determination of which atoms are assigned to which edges may be based on which rules own a given atom for a given state (e.g., a given network device).

At block 470, one or more transitive edges may be identified within the pushdown automata using an algorithm (e.g., a saturation-based algorithm). The identification of transitive edges may start at the entry boundary states as determined at the block 450. The transitive edges may be identified by traversing the pushdown automata using a saturation-based algorithm. As the saturation-based algorithm traverses the pushdown automata, the algorithm may identify a series of edges associated with the variable-length header portion of the pushdown automata that each are applicable to a set of IP addresses in the same manner.

In addition to a saturation-based algorithm, any other space-exploring algorithm may be used. For example, a depth-first search (DFS) algorithm may be used to traverse the graph representation. A DFS algorithm may traverse a graph representation by searching deeper into the graph representation before exploring the breadth of the graph representation (e.g., following one path all the way through the graph representation before starting along another path). As another example, a breadth-first search (BFS) algorithm may be used to traverse the graph representation. A BFS algorithm may traverse a graph representation by searching along all options of a give node of the graph representation before continuing along another path in graph representation (e.g., fully searching one node before moving on to another node).

At block 480, atoms may be propagated from a given entry boundary state to an exit boundary state based on the transitive edges. For example, an edge transitioning to the given entry boundary state may be labeled with a given atom, and that atom may be propagated to the edge leading to the exit boundary state associated with a given transitive edge. In these and other embodiments, the propagation of the atoms may provide an improved pushdown automata and a more efficient representation of the network, as the transitive edges may collapse portions of the pushdown automata with respect to the analysis of atoms.

One or more of the blocks of FIG. 4 may provide examples or further details to carrying out one or more of the blocks of FIG. 3. For examples, blocks 410-420 (FIG. 4) may provide examples of and/or provide further details to carrying out block 330 (FIG. 3); blocks 430-460 (FIG. 4) may provide examples of and/or provide further details to carrying out one or more of the blocks 340 (FIG. 3); blocks 470-480 may provide examples of and/or provide further details to carrying out block 350 (FIG. 3).

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Any of the methods 300 or 400 of FIGS. 3 and 4 may be performed by any suitable system, apparatus, or device. For example, the environment 100 of FIG. 1 or one or more of the components thereof such as the control device 170 may perform one or more of the operations associated with the methods 300 and/or 400. In these and other embodiments, program instructions stored on a computer readable medium may be executed to perform one or more of the operations of the methods 300 and/or 400. Modifications, additions, or omissions may be made to any of the methods 300 and/or 400 without departing from the scope of the present disclosure. For example, the operations of the methods 300 and/or 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 5:
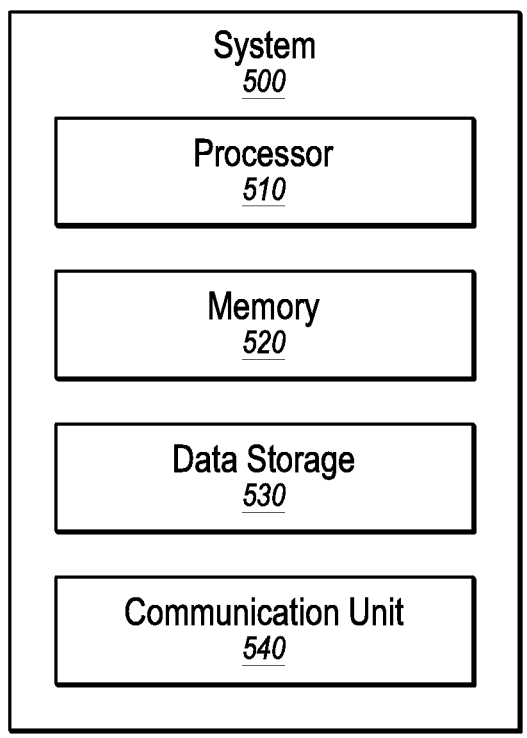
FIG. 5 illustrates an example computing system.

FIG. 5 illustrates an example computing system 500, according to at least one embodiment described in the present disclosure. The system 500 may include any suitable system, apparatus, or device configured to verify network properties or function as a network device in such a network to be verified. The computing system 500 may include a processor 510, a memory 520, a data storage 530, and a communication unit 540, which all may be communicatively coupled. The data storage 530 may include various types of data, such as forwarding rules for use in a network that handles MPLS packets and/or IP packets.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform the methods 300 and/or 400 of FIGS. 3 and 4, respectively. For example, the processor 510 may obtain forwarding rules of network devices in a network, and may generate a pushdown automata representing that network based on the forwarding rules. As another example, the processor 510 may apply various algorithms to such a pushdown automata.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as network devices, control devices, and/or other networks.

Modifications, additions, or omissions may be made to the system 500 without departing from the scope of the present disclosure. For example, the data storage 530 may be multiple different storage mediums located in multiple locations and accessed by the processor 510 through a network.

As indicated above, the embodiments described in the present disclosure may include the use of a special purpose or general purpose computer (e.g., the processor 510 of FIG. 5) including various computer hardware or software modules, as discussed in greater detail below. Further, as indicated above, embodiments described in the present disclosure may be implemented using computer-readable media (e.g., the memory 520 or data storage 530 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of network property verification in a network, the method comprising:
    obtaining a property of a network to be verified;
    obtaining forwarding rules for a plurality of network devices in the network, the forwarding rules indicative of how the plurality of network devices handle an incoming packet, at least one of the plurality of network devices including at least a first forwarding rule configured to forward an address-based packet and a second forwarding rule configured to forward a variable-length header packet;

generating a graph representation of the forwarding rules in the network, each rule of the forwarding rules independently applicable to address-based packets or variable-length header packets;

assigning transition operations between the plurality of network devices in the graph representation based on the forwarding rules;

assigning, in the graph representation, an atom to one or more links between any of the plurality of network devices that forward packets in a format of the variable-length header packet, the atom representing a range of addresses applicable to one or more of the address-based packets; and verifying the property of the network using the graph representation to identify any network issue.

2. The method of claim 1, wherein generating the graph representation includes generating a pushdown automata where each network device is represented by at least one state.

3. The method of claim 2, wherein generating the graph representation includes creating an additional pushdown automata state for network devices that forward packets in a format of the address-based packet.

4. The method of claim 1, wherein generating the graph representation includes creating atoms to represent ranges of addresses forwarded by the forwarding rules configured to forward packets in the format of the address-based packet.

5. The method of claim 4, further comprising determining a plurality of entry boundary states representing one or more network devices that sit at a boundary where packets are routed from portions of the network that handle packets in the format of the address-based packets to portions of the network that handle packets in the format of the variable-length header packet.

6. The method of claim 5, wherein assigning an atom to one or more links between any of the plurality of network devices includes:

using the graph representation and starting at the entry boundary states, identifying a transitive edge that represents a route of packets through at least a part of the network that handles packets in the format of the variable-length header packet to an exit boundary state, the transitive edge identified based on a series of operations that include both push and pop operations in a stack, the exit boundary state identified based on where the stack is empty; and propagating an atom of the graph representation associated with a link to the entry boundary state to a link to the exit boundary state based on the transitive edge.

7. The method of claim 1, wherein the address-based packet includes an Internet Protocol (IP) packet and the variable-length header packet includes a Multi-Protocol Label Switching (MPLS) packet.

8. A non-transitory computer-readable medium containing instructions that, in response to being executed, cause a system to perform operations, the operations comprising:

obtaining a property of a network to be verified;

obtaining forwarding rules for a plurality of network devices in the network, the forwarding rules indicative of how the plurality of network devices handle an incoming packet, at least one of the plurality of network devices including at least a first forwarding rule configured to forward an address-based packet and a second forwarding rule configured to forward a variable-length header packet;

generating a graph representation of the forwarding rules in the network, each rule of the forwarding rules independently applicable to address-based packets or variable-length header packets;

assigning transition operations between the plurality of network devices in the graph representation based on the forwarding rules;

assigning, in the graph representation, an atom to one or more links between any of the plurality of network devices that forward packets in a format of the variable-length header packet, the atom representing a range of addresses applicable to one or more of the address-based packets; and verifying the property of the network using the graph representation to identify any network issue.

9. The computer-readable medium of claim 8, wherein generating the graph representation includes generating a pushdown automata where each network device is represented by at least one state.

10. The computer-readable medium of claim 9, wherein generating the graph representation includes creating an additional pushdown automata state for network devices that forward packets in a format of the address-based packet.

11. The computer-readable medium of claim 8, wherein generating the graph representation includes creating atoms to represent ranges of addresses forwarded by the forwarding rules configured to forward packets in the format of the address-based packet.

12. The computer-readable medium of claim 8, further comprising determining a plurality of entry boundary states representing one or more network devices that sit at a boundary where packets are routed from portions of the network that handle packets in the format of the address-based packets to portions of the network that handle packets in the format of the variable-length header packet.

13. The computer-readable medium of claim 12, wherein assigning an atom to one or more links between any of the plurality of network devices includes:

using the graph representation and starting at the entry boundary states, identifying a transitive edge that represents a route of packets through at least a part of the network that handles packets in the format of the variable-length header packet to an exit boundary state, the transitive edge identified based on a series of operations that include both push and pop operations in a stack, the exit boundary state identified based on where the stack is empty; and propagating an atom of the graph representation associated with a link to the entry boundary state to a link to the exit boundary state based on the transitive edge.

14. The computer-readable medium of claim 8, wherein the address-based packet includes an Internet Protocol (IP) packet and the variable-length header packet includes a Multi-Protocol Label Switching (MPLS) packet.

15. A system comprising:

one or more processors; and one or more non-transitory computer-readable media containing instructions that, in response to being executed by the one or more processors, cause the system to perform operations, the operations comprising:

obtaining a property of a network to be verified;

obtaining forwarding rules for a plurality of network devices in the network, the forwarding rules indicative of how the plurality of network devices handle an incoming packet, at least one of the plurality of network devices including at least a first forwarding rule configured to forward an address-based packet and a second forwarding rule configured to forward a variable-length header packet;

generating a graph representation of the forwarding rules in the network, each rule of the forwarding rules independently applicable to address-based packets or variable-length header packets;

assigning transition operations between the plurality of network devices in the graph representation based on the forwarding rules;

assigning, in the graph representation, an atom to one or more links between any of the plurality of network devices that forward packets in a format of the variable-length header packet, the atom representing a range of addresses applicable to one or more of the address-based packets; and verifying the property of the network using the graph representation to identify any network issue.

16. The system of claim 15, wherein generating the graph representation includes:

generating a pushdown automata where each network device is represented by at least one state; and creating an additional pushdown automata state for network devices that forward packets in a format of the address-based packet.

17. The system of claim 15, wherein generating the graph representation includes creating atoms to represent ranges of addresses forwarded by the forwarding rules configured to forward packets in the format of the address-based packet.

18. The system of claim 15, further comprising determining a plurality of entry boundary states representing one or more network devices that sit at a boundary where packets are routed from portions of the network that handle packets in the format of the address-based packets to portions of the network that handle packets in the format of the variable-length header packet.

19. The system of claim 18, wherein assigning an atom to one or more links between any of the plurality of network devices includes:

using the graph representation and starting at the entry boundary states, identifying a transitive edge that represents a route of packets through at least a part of the network that handles packets in the format of the variable-length header packet to an exit boundary state, the transitive edge identified based on a series of operations that include both push and pop operations in a stack, the exit boundary state identified based on where the stack is empty; and propagating an atom of the graph representation associated with a link to the entry boundary state to a link to the exit boundary state based on the transitive edge.

20. The system of claim 15, wherein the address-based packet includes an Internet Protocol (IP) packet and the variable-length header packet includes a Multi-Protocol Label Switching (MPLS) packet.

* * * * *